(12) United States Patent
Hata

(10) Patent No.: US 6,849,694 B2
(45) Date of Patent: Feb. 1, 2005

(54) IMPACT MODIFIER COMPOSITIONS FOR RIGID PVC COMPOSITIONS OF HYDROCARBON RUBBERS AND CHLORINATED POLYETHYLENE

(75) Inventor: Nobuhiro Hata, Kanagawa (JP)

(73) Assignee: DuPont Dow Elastomers, LLC, Wilmington, DE (US)

( * ) Notice: Subject to any disclaimer, the term of this patent is extended or adjusted under 35 U.S.C. 154(b) by 0 days.

(21) Appl. No.: 10/342,499

(22) Filed: Jan. 15, 2003

(65) Prior Publication Data

US 2003/0153687 A1 Aug. 14, 2003

Related U.S. Application Data

(60) Provisional application No. 60/349,745, filed on Jan. 17, 2002.

(51) Int. Cl.$^7$ ................................ C08L 27/06
(52) U.S. Cl. .................. 525/239; 525/240; 525/334.1
(58) Field of Search .................. 525/239, 240, 525/334.1

(56) References Cited

U.S. PATENT DOCUMENTS

| | | |
|---|---|---|
| 2,586,363 A | 2/1952 | McAlevy |
| 3,006,889 A | 10/1961 | Frey |
| 3,085,082 A | 4/1963 | Beer et al. |
| 3,209,055 A | 9/1965 | Hedberg et al. |
| 3,296,222 A | 1/1967 | Dixon et al. |
| 3,299,014 A | 1/1967 | Kalil |
| 3,396,211 A | 8/1968 | Bonotto et al. |
| 3,454,544 A | 7/1969 | Young et al. |
| 3,891,720 A | 6/1975 | Severini et al. |
| 3,940,456 A | 2/1976 | Frey et al. |
| 3,975,458 A | 8/1976 | Severini et al. |
| 4,054,615 A | 10/1977 | Hardt et al. |
| 4,234,703 A | 11/1980 | Lindsay |
| 4,591,621 A | 5/1986 | Ennis |
| 4,767,817 A | 8/1988 | Lee |
| 4,767,823 A | 8/1988 | Jones et al. |
| 5,242,987 A | 9/1993 | Brugel |
| 5,270,381 A | 12/1993 | Yamanaka et al. |
| 5,272,236 A | 12/1993 | Lai et al. |
| 5,278,272 A | 1/1994 | Lai et al. |
| 5,681,897 A | 10/1997 | Silvis et al. |
| 5,688,866 A | 11/1997 | Silvis et al. |
| 5,856,406 A | 1/1999 | Silvis et al. |
| 5,861,463 A | 1/1999 | Sehanobish et al. |
| 5,925,703 A | 7/1999 | Betso et al. |
| 6,063,846 A | 5/2000 | Weng et al. |
| 6,124,406 A | 9/2000 | Cinadr et al. |
| 6,204,334 B1 * | 3/2001 | Cinadr et al. ............... 525/239 |
| 6,239,221 B1 | 5/2001 | Chen |

FOREIGN PATENT DOCUMENTS

| | | |
|---|---|---|
| DE | 130257 A | 3/1978 |
| GB | 1097019 A | 1/1968 |
| JP | 02045543 A | 2/1990 |
| JP | 06049280 A | 2/1994 |
| JP | 06057048 A | 3/1994 |
| JP | 06057051 A | 3/1994 |
| JP | 06065444 A | 3/1994 |
| JP | 06228391 A | 8/1994 |
| JP | 07011049 A | 1/1995 |
| JP | 07011085 A | 1/1995 |

OTHER PUBLICATIONS

Naser Pourahmady, Carole Lepilleur, Robert Detterman, Arthur Backman, A Multiblock Copolymer Compatibilizer For PVC/Polyolefin Blends, AddconWorld 2000, Paper 18/4, Rapra Technology Ltd., Shrewsbury, UK.

Eric A. Eastwood, Mark D. Dadmun, Naser Pourahmady, Carole Lepilleur, Compatibilization Of Blends Containing Poly(Vinyl Chloride) And A Polyolefin Elastomer By Blocky Chlorinated Polyethylenes, Polymer Preprints, 2001, 42(2), 850–851, American Chemical Society.

Yu Der Lee, Chi Ming Chen, Properties Of PVC/CPE/EPDM Polyblends, Journal of Applied Polymer Science, 1987, 1231–1240, vol. 33, John Wiley & Sons, Inc.

Changren Zheng, Jun Zhang, Youyan Wang, Preparation And Mechanical Properties Of PVC/EPDM Alloy, Gaofenzi Cailiao Kexue Yu Gongcheng, 1994, 10(1), 28–32, Abstract only.

* cited by examiner

Primary Examiner—Roberto Rabago

(57) ABSTRACT

The present invention is specifically directed to improved polyvinyl chloride compositions having excellent impact strength. In particular, the impact resistant composition comprises a vinyl chloride polymer and 2–8 parts of an impact modifier composition comprising at least one ethylene/alpha-olefin copolymer and at least one chlorinated olefin polymer per 100 parts of the vinyl chloride polymer. Preferably the impact modifier composition comprises less than 1 part of the ethylene/alpha-olefin copolymer and the ratio of said copolymer to the total modifier composition is less than 25%.

6 Claims, No Drawings ably 40 to 90 weight percent ethylene, 10 to 60 weight percent of an alpha-olefin up to 10 weight percent of a copolymerizable polyene, as well as copolymers comprising two or more monomers selected from these monomers.

IMPACT MODIFIER COMPOSITIONS FOR RIGID PVC COMPOSITIONS OF HYDROCARBON RUBBERS AND CHLORINATED POLYETHYLENE

CROSS-REFERENCE TO RELATED APPLICATIONS

This application claims the benefit of U.S. Provisional Application No. 60/349,745 filed Jan. 17, 2002.

FIELD OF THE INVENTION

This invention relates to improved impact resistant vinyl chloride polymer compositions. More specifically, this invention relates to polyvinyl chloride impact modifier compositions comprising blends of hydrocarbon rubber and chlorinated polyethylene.

BACKGROUND OF THE INVENTION

Polyvinyl chloride (PVC) is widely used in both its rigid and flexible forms in such applications as films, siding, sheets, pipe and tubing. Because rigid PVC is a hard, brittle thermoplastic polymer, it is often mixed with a modifier to form a composition that is less prone to failure on impact. Known PVC modifiers include polyacrylic resins, butadiene-containing polymers such as methacrylate butadiene styrene terpolymers (MBS), and chlorinated polyethylene (CPE) resins. For example, in U.S. Pat. Nos. 3,006,889 and 3,209,055 the use of a broad range of chlorinated and chlorosulfonated polyethylenes in blends with PVC is disclosed. These modifiers form small rubbery microdomains when mixed in PVC compositions that improve the impact resistance of these compositions.

Hydrocarbon rubbers such as ethylene/alpha-olefin copolymers have advantages over the aforementioned modifiers in that they are low density, have excellent stability at PVC processing temperatures (e.g. 170–210° C.) and are UV resistant. For example, in U.S. Pat. No. 5,925,703 Betso et al. teach the use of linear ethylene/alpha-olefins to improve impact performance of filled thermoplastic compositions, including polyvinyl chlorides. However, the use of these hydrocarbon rubbers as impact modifiers for rigid PVC applications has been hampered by the fact that the small rubbery microdomains have not formed in the size range for effective impact modification when the hydrocarbon rubbers are mixed in PVC compounds.

More recently, impact modifiers that are mixtures containing chlorinated polyethylenes and other polymers have been disclosed. As an example, Aono et al., in Japanese Published Patent Application No. 7-11085, disclose the use of a mixture of a chlorinated polyethylene prepared from a polyethylene of molecular weight 50,000 to 400,000 and AES resin (acrylonitrile-EPDM-styrene), optionally in combination with other polymers, as an impact modifier for PVC. Further, in U.S. Pat. No. 6,124,406 Cinadr et al. teach that blocky chlorinated polyethylenes can be used to compatibilize hydrocarbon rubber and PVC to give a PVC composition with improved impact resistance. The Cinadr patent also teaches that randomly chlorinated polyethylenes, such as Tyrin® chlorinated polyethylene, are ineffective as compatibilizers due to poor interfacial adhesion between the PVC and hydrocarbon rubber. The Cinadr patent teaches PVC compositions containing 0.5–10 parts wt. of the blocky chlorinated polyethylene and 1–10 pts.wt. of a polyolefin elastomer per 100 pts.wt. of PVC. Similarly, Mitsubishi Kasei Vinyl KK in Japanese Published Patent Application No. 2-45543, disclose vinyl chloride resin compositions containing 1–10 parts wt. of a chlorinated polyethylene and 1–10 pts.wt. of an ethylene/alpha-olefin copolymer per 100 parts of the vinyl chloride resin.

SUMMARY OF THE INVENTION

We have found that the impact strength of vinyl chloride resin compositions can be improved by the use of an impact modifier compostion comprising an ethylene/alpha-olefin copolymer and a chlorinated olefin polymer at specific concentrations and ratios of modifier. We have also found that there is a maximum benefit when the impact modifier composition is 2–8 parts per 100 parts of the vinyl chloride polymer. The best results are found when the ratio of the ethylene/alpha-olefin copolymer to the total modifier composition is less than 25%. We have also found that the impact resistance is related to the gloss, or smoothness of the surface of the PVC article. As gloss decreases, it is suspected that surface irregularities cause break points that cause the impact strength to decrease.

The present invention is specifically directed to improved polyvinyl chloride compositions having excellent impact strength. In particular, the impact resistant composition comprises a vinyl chloride polymer and 2–8 parts of an impact modifier composition comprising at least one ethylene/alpha-olefin copolymer and at least one chlorinated olefin polymer per 100 parts of the vinyl chloride polymer. Preferably the impact modifier composition comprises less than 1 part of the ethylene/alpha-olefin copolymer and the ratio of said copolymer to the total modifier composition is less than 25%.

DETAILED DESCRIPTION OF THE INVENTION

The impact resistant compositions of the present invention comprise a vinyl chloride polymer and an impact modifier composition comprising a hydrocarbon rubber, and a chlorinated olefin polymer.

The vinyl chloride polymer component is a solid, high molecular weight polymer that may be a polyvinyl chloride homopolymer or a copolymer of vinyl chloride having copolymerized units of one or more additional comonomers. When present, such comonomers will account for up to 20 weight percent of the copolymer, preferably from 1–5 weight percent of the copolymer. Examples of suitable comonomers include $C_2$–$C_6$ olefins, for example ethylene and propylene; vinyl esters of straight chain or branched $C_2$–$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$–$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. Such homopolymers and copolymers are commercially available from Borden Chemicals and Plastics and Shintech. They may also be prepared by any suitable polymerization method. Polymers prepared using a suspension process are preferred.

Graft copolymers of vinyl chloride are also suitable for use in the invention. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component. A commercially available example of such a polymer is Vinnol® 550, available from Wacker Chemie GmbH.

The chlorinated olefin polymer component of the compositions of the invention is selected from the group consisting of a) chlorinated polyethylene homopolymers and b) chlorinated copolymers that contain copolymerized units of i) ethylene and ii) a copolymerizable monomer. The chlorinated olefin polymer may optionally include chlorosulfonyl groups. That is, the polymer chain will have pendant chlorine groups and chlorosulfonyl groups. Such polymers are known as chlorosulfonated olefin polymers.

Representative chlorinated olefin polymers include a) chlorinated and chlorosulfonated homopolymers of ethylene and b) chlorinated and chlorosulfonated copolymers of ethylene and at least one ethylenically unsaturated monomer selected from the group consisting of $C_3$–$C_{10}$ alpha monoolefins; $C_1$–$C_{12}$ alkyl esters of $C_3$–$C_{20}$ monocarboxylic acids; unsaturated $C_3$–$C_{20}$ mono- or dicarboxylic acids; anhydrides of unsaturated $C_4$–$C_8$ dicarboxylic acids; and vinyl esters of saturated $C_2$–$C_{18}$ carboxylic acids. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Preferred chlorinated olefin polymers are chlorinated polyethylene and chlorinated copolymers of ethylene vinyl acetate.

The chlorinated olefin polymers and chlorosulfonated olefin polymers suitable for use in the impact resistant compositions of the invention may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363; 3,296,222; 3,299,014; and 5,242,987.

Hydrocarbon rubbers such as ethylene/alpha-olefin copolymers are copolymers of ethylene with at least one $C_3$–$C_8$ alpha-olefin (preferably an aliphatic alpha-olefin) comonomer, and optionally, a polyene comonomer, e.g., a conjugated diene, a nonconjugated diene, a triene, etc. Examples of the $C_3$–$C_8$ alpha-olefins include propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (e.g., alpha-methylstyrene, etc.) are alpha-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene ($CH_3CH$=$CH$—$CH$=$CH_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary copolymers include ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene. Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (e.g. ENB), ethylene/butene/1-octene/diene and ethylene/propylene/mixed dienes, e.g. ethylene/propylene/5-ethylidene-2-norbornene/piperylene. In addition, the blend components can include minor amounts, e.g. 0.05–0.5 percent by weight, of long chain branch enhancers, such as 2,5-norbornadiene (aka bicyclo[2,2,1]hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

The ethylene/alpha-olefin polymer components of this invention can be produced using any conventional ethylene/alpha-olefin polymerization technology known in the art. For example, polymerization of the ethylene/alpha-olefin polymer may be accomplished at conditions well known in the art for Ziegler-Natta or Kaminsky-Sinn type polymerization reactions. The ethylene/alpha-olefin polymer components of this invention may also be made using a mono- or bis-cyclopentadienyl, indenyl, or fluorenyl transition metal (preferably Group 4) catalysts or constrained geometry catalysts. Suspension, solution, slurry, gas phase, solid-state powder polymerization or other process conditions may be employed if desired. A support, such as silica, alumina, or a polymer (such as polytetrafluoroethylene or a polyolefin) may also be employed if desired.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The impact resistant compositions of the invention will generally comprise 2–8 parts by weight of the impact modifying composition per hundred parts by weight of vinyl chloride polymer. Preferably, the impact modifying composition contains less than 25% hydrocarbon rubber.

The impact resistant compositions of the present invention are physical blends of polymers and do not require crosslinking or vulcanization in order to be useful as commercial products. The compositions can additionally contain fillers. Particularly useful fillers include silica, clay, titanium dixide, talc, calcium carbonate, and other mineral fillers. Calcium carbonate is preferred. The compositions can additionally contain other compounding ingredients such as stabilizers, blowing agents, lubricants, pigments, colorants, process aids, plasticizers, crosslinking agents and the like. The use of such additional components permits the compositions to be tailored for use in various applications, for example rigid PVC siding, pipe and profiles such as windows, fencing, decking and electrical conduit. Particularly useful compounding ingredients include tin, lead and calcium/zinc stabilizers, polymethylmethacrylate process aids, and hydrocarbon, ester, or amide waxes. If compounding ingredients are utilized, they are generally used in amounts of from 0.1–30 parts per hundred parts vinyl chloride resin, depending on the type of additive.

The impact resistant compositions of the present invention are particularly useful in the manufacture of PVC siding, profiles, sheets, and pipes.

The invention is further illustrated by the following embodiments wherein all parts are by weight unless otherwise indicated.

EXAMPLES

Example 1-1

A PVC composition was prepared in a Mitsui Mining Company Henschel mixer according to the following procedure: 100 parts Shin-Etsu Chemical TK-1000 PVC was added to the mixer and the contents were heated until the temperature reached 113° F. (45° C.). Then 0.5 parts of STANN™ ONZ-100F tin stabilizer was then added and blending was continued. When a temperature of 140° F. (60° C.) was reached, 0.5 parts of Luwax®OA2 Powder oxidized polyethylene wax, 0.5 parts of Luwax®A powder polyethylene wax, 0.5 parts of SAK-CS-P® calcium stearate, and 0.5 parts of Luvax® 2191 paraffin wax were added. Blending was continued until a temperature of 149° F. (65° C.) was reached, wherein 1.8 parts of Tyrin® 3600P chlorinated polyethylene was added followed by addition of 0.2 parts of Engage® 8842 ethylene-octene copolymer. Blending was again continued until a temperature of 185° F. (85° C.) was reached. The speed of the mixer was lowered to the minimum and the mixer was cooled externally. When the temperature of the mixture reached 122° F. (50° C.), the composition was removed and approximately 6000 g was collected.

The composition was processed on a laboratory scale counter-rotating, conical twin-screw extruder (Toyoseiki 2D20C). The screws were 3 cm tapering to 2 cm, vented, and with a L/D ratio of 20:1. A 15 cm sheet die with an adjustable gap set at approximately 1.5 mm was used. Zone 1 was the feed section of the extruder and was set at 170° C., Zones 2 and 3 were the middle and end of the extruder, set at 180 and 195° C., respectively. Zones 1–3 had air-cooling capability. Zone 4, which was the die, was set at 195° C. The extruder revolutions/minute (RPM) was set at 90.

The compound powder was introduced via a separate feed hopper with a feed screw that was controlled to give 74 g/min output, and the sheet was drawn down with a take up unit to produce a sheet with a final width of 15.5 to 16 cm.

The impact resistance of the sheet was determined using a BKY-Gardner USA, Inc. Gardner-SPI® Modified dart impact tester. Twenty representative samples coloring at −10° C. were impacted by falling weight 8-lb, die and die support. The nose of the punch was 1.27 cm in diameter. The inside diameter of the die was 1.63 cm. The fixed weight was dropped from various heights and the energy that caused 50% of the specimens tested to fail was measured. The calculated mean-failure energy for Example 1-1 was 152 kg-cm.

Comparative Example 1

A PVC composition was prepared in a Mitsui Mining Company Henschel mixer according to the following procedure: 100 parts Shin-Etsu Chemical® TK-1000 PVC was added to the mixer and the contents were heated until the temperature reached 113° F. (45° C.). Then 0.5 parts of STANN™ ONZ-100F. tin stabilizer was then added and blending was continued. When a temperature of 140° F. (60° C.) was reached, 0.5 parts of Luwax®OA2 Powder oxidized polyethylene wax, 0.5 parts of Luwax® A powder polyethylene wax, 0.5 parts of SAK-CS-P® calcium stearate, and 0.5 parts of Luvax® 2191 paraffin wax were added. Blending was continued until a temperature of 149° F. (65° C.) was reached, wherein 2.0 parts of Tyrin® 3600P chlorinated polyethylene was added. Blending was again continued until a temperature of 185° F. (85° C.) was reached. The speed of the mixer was lowered to the minimum and the mixer was cooled externally. When the temperature of the mixture reached 122° F. (50° C.), the composition was removed and approximately 6000 g was collected.

The PVC composition was processed in an identical manner to that of Example 1-1 and tested under identical conditions to Example 1-1 for Gardner impact resistance. The impact resistance of this comparative example was 149 kg-cm.

Results are shown in Table 1. The compositions of Examples 1-1 through 1-5 have 2 parts total modifier per 100 parts PVC. Likewise, Examples 2-1 through 2-4 have 3 parts total modifer per 100 parts PVC, and so on. The Comparative Examples show modifier compositions having only chlorinated polyethylene.

The examples of the invention demonstrate improved impact performance relative to the comparative examples. Furthermore, there is a maximum in the impact performance for examples of the invention where the ratio of the ethylene-octene copolymer to the total modifier composition is less than 25%.

The Following Materials Were Used in the Examples:

TK-1000 Polyvinyl Chloride is available from Shinetu Chemical

Tyrin® 3600P Chlorinated Polyethylene and Engage® 8842 ethylene-octene copolymer are available from DuPont Dow Elastomers L.L.C.

STANN™ ONZ-100F tin stabilizer is available from Sunkyoyuukigousei.

Luwax® OA2 oxidized polyethylene wax and Luwax® A powder polyethylene wax are both available from BASF.

SAK-CS-P calcium stearate is available from Sinagawakakou.

Luvax®-2191 paraffin wax is available from Nipponseiro.

TABLE 1

Impact Tests Results for Example 1-1 through 7-2 and Comparative Examples 1 through 7

| Example | formulation | | | Gloss [%/Gs60] | Gardner Impact [kg · cm] |
|---|---|---|---|---|---|
| | PVC [wt %] | CPE [phr] | EO [phr] | | |
| Comp. 1 | 100 | 2.0 | 0.0 | 60.7 | 149 |
| 1-1 | 100 | 1.8 | 0.2 | 55.0 | 152 |
| 1-2 | 100 | 1.6 | 0.4 | 53.3 | 145 |
| 1-3 | 100 | 1.4 | 0.6 | 28.6 | 116 |
| 1-4 | 100 | 1.2 | 0.8 | 15.6 | <18 |
| 1-5 | 100 | 1.0 | 1.0 | 16.4 | <18 |
| Comp. 2 | 100 | 3.0 | 0.0 | 61.8 | 160 |
| 2-1 | 100 | 2.7 | 0.3 | 60.6 | 171 |
| 2-2 | 100 | 2.4 | 0.6 | 49.3 | 134 |
| 2-3 | 100 | 2.1 | 0.9 | 12.7 | <18 |
| 2-4 | 100 | 1.8 | 1.2 | 9.8 | <18 |

TABLE 1-continued

Impact Tests Results for Example 1-1 through 7-2 and Comparative Examples 1 through 7

| Example | formulation | | | Gloss [%/Gs60] | Gardner Impact [kg · cm] |
|---|---|---|---|---|---|
| | PVC [wt %] | CPE [phr] | EO [phr] | | |
| Comp. 3 | 100 | 4.0 | 0.0 | 65.1 | 163 |
| 3-1 | 100 | 3.6 | 0.4 | 64.0 | 174 |
| 3-2 | 100 | 3.2 | 0.8 | 55.2 | 196 |
| 3-3 | 100 | 2.8 | 1.2 | 39.1 | 163 |
| 3-4 | 100 | 2.4 | 1.6 | 20.8 | 118 |
| Comp. 4 | 100 | 5.0 | 0.0 | 66.5 | 174 |
| 4-1 | 100 | 4.5 | 0.5 | 63.0 | 221 |
| 4-2 | 100 | 4.0 | 1.0 | 55.6 | 223 |
| 4-3 | 100 | 3.5 | 1.5 | 45.2 | 172 |
| 4-4 | 100 | 3.0 | 2.0 | 19.9 | 109 |
| Comp. 5 | 100 | 6.0 | 0.0 | 70.8 | 181 |
| 5-1 | 100 | 5.4 | 0.6 | 62.4 | 232 |
| 5-2 | 100 | 4.8 | 1.2 | 53.8 | 214 |
| Comp. 6 | 100 | 7.0 | 0.0 | 72.5 | 221 |
| 6-1 | 100 | 6.3 | 0.7 | 67.8 | 261 |
| 6-2 | 100 | 5.6 | 1.4 | 46.7 | 213 |
| Comp. 7 | 100 | 8.0 | 0.0 | 76.4 | 247 |
| 7-1 | 100 | 7.2 | 0.8 | 51.3 | 263 |
| 7-2 | 100 | 6.4 | 1.6 | 18.1 | 221 |

PVC = TK-1000 Polyvinyl Chloride
CPE = Tyrin ® 3600P Chlorinated Polyethylene
EO = Engage ® 8842 ethylene-octene copolymer

What is claimed is:

1. A impact resistant vinyl chloride polymer composition comprising 2–8 parts per 100 parts vinyl chloride polymer of:

a) at least one ethylene/alpha-olefin copolymer and b) at least one chlorinated polyolefin wherein said impact resistant composition contains less than 1 part ethylene/alpha olefin copolymer and the ratio of ethylene/alpha olefin copolymer to the total of both ethylene/alpha olefin copolymer and chlorinated polyolefin is less than 25%.

2. The composition of claim 1 wherein the alpha-olefin is a $C_3$–$C_8$ olefin.

3. The composition of claim 1 wherein the ethylene/alpha-olefin copolymer is selected from the group consisting of ethylene/propylene, ethylene/butene, ethylene/hexene, ethylene/octene, ethylene/propylene/5-ethylidene-2-norbornene, and ethylene/butene/5-ethylidene-2-norbornene copolymers.

4. The composition of claim 1 wherein the chlorinated polyolefin is chlorinated polyethylene.

5. The composition of claim 1 wherein the chlorinated polyolefin is a chlorinated copolymer of ethylene and one or more $C_3$–$C_8$ alpha-olefins.

6. An article comprising a pipe, profile, sheet, or vinyl siding made from an impact resistant vinyl chloride polymer composition according to any of claims 1–5.

* * * * *